(12) United States Patent
Rivera et al.

(10) Patent No.: US 11,176,830 B2
(45) Date of Patent: *Nov. 16, 2021

(54) VEHICLE LOCATION TRACKING SYSTEMS AND METHODS

(71) Applicant: AMERICAN TRAFFIC SOLUTIONS, INC., Mesa, AZ (US)

(72) Inventors: Jason A. Rivera, Chandler, AZ (US); Jason A. Fox, Chandler, AZ (US); David Grimwood, Phoenix, AZ (US)

(73) Assignee: AMERICAN TRAFFIC SOLUTIONS, INC., Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,422

(22) Filed: Jul. 9, 2020

(65) Prior Publication Data

US 2020/0410866 A1    Dec. 31, 2020

Related U.S. Application Data

(63) Continuation of application No. 16/749,613, filed on Jan. 22, 2020, now Pat. No. 10,720,061, which is a
(Continued)

(51) Int. Cl.
*G08G 1/00* (2006.01)
*G08G 1/005* (2006.01)
(Continued)

(52) U.S. Cl.
CPC .............. *G08G 1/205* (2013.01); *G08G 1/005* (2013.01); *H04W 4/029* (2018.02); *H04W 4/40* (2018.02); *H04W 4/80* (2018.02)

(58) Field of Classification Search
CPC ....... G08G 1/205; G08G 1/005; H04W 4/029; H04W 4/40; H04W 4/80
See application file for complete search history.

(56) References Cited

U.S. PATENT DOCUMENTS

5,635,693 A  *  6/1997  Benson ................... G08G 1/127
                                                340/10.33
5,844,522 A    12/1998  Sheffer et al.
(Continued)

FOREIGN PATENT DOCUMENTS

DE    102008006356 A1    7/2009
KR    1020100063612 A    6/2010
(Continued)

OTHER PUBLICATIONS

U.S. Appl. No. 16/018,881, Final Office Action, dated Jun. 13, 2019, 25 pages.
(Continued)

*Primary Examiner* — Adnan Aziz
(74) *Attorney, Agent, or Firm* — Stoel Rives LLP

(57) ABSTRACT

A vehicle location tracking system comprises a plurality of transceivers, a coordinator, and a plurality of identification tags. The plurality of identification tags are coupled to a fleet of vehicles to be tracked. The transceivers measure the strength of a signal emitted by an identification tag coupled to a vehicle and communicate the measured signal strength to the coordinator. The indoor vehicle location tracking system estimates the location of the vehicle based on the measured signal strength.

20 Claims, 6 Drawing Sheets

Related U.S. Application Data continuation of application No. 16/018,881, filed on Jun. 26, 2018, now Pat. No. 10,559,210.

(60) Provisional application No. 62/525,449, filed on Jun. 27, 2017.

(51) Int. Cl.
*H04W 4/029* (2018.01)
*H04W 4/40* (2018.01)
*H04W 4/80* (2018.01)

(56) References Cited

U.S. PATENT DOCUMENTS

| | | | |
|---|---|---|---|
| 5,920,287 | A | 7/1999 | Belcher et al. |
| 6,052,068 | A | 4/2000 | Price et al. |
| 6,112,152 | A * | 8/2000 | Tuttle .................. G07B 15/063 340/5.61 |
| 6,427,913 | B1 * | 8/2002 | Maloney .............. G06K 7/0008 235/383 |
| 6,600,418 | B2 | 7/2003 | Francis et al. |
| 7,768,392 | B1 | 8/2010 | Brand et al. |
| 8,111,141 | B1 | 2/2012 | Brand et al. |
| 8,812,065 | B2 | 8/2014 | Miller et al. |
| 9,722,715 | B2 | 8/2017 | Nair |
| 10,134,210 | B1 | 11/2018 | Gravelle et al. |
| 2006/0187043 | A1 | 8/2006 | Allen |
| 2007/0184852 | A1 | 8/2007 | Johnson et al. |
| 2008/0129545 | A1 | 6/2008 | Johnson et al. |
| 2008/0231446 | A1 | 9/2008 | Cresto |
| 2009/0015410 | A1 | 1/2009 | Puzio et al. |
| 2009/0033466 | A1 | 2/2009 | Song et al. |
| 2009/0060080 | A1 | 3/2009 | Malik et al. |
| 2010/0060452 | A1 | 3/2010 | Schuster et al. |
| 2010/0063612 | A1 | 3/2010 | Wang et al. |
| 2010/0094482 | A1 | 4/2010 | Schoffield et al. |
| 2011/0021234 | A1 | 1/2011 | Tibbitts et al. |
| 2011/0054731 | A1 | 3/2011 | Derose |
| 2011/0095869 | A1 | 4/2011 | Yang et al. |
| 2011/0128163 | A1 | 6/2011 | Gilleland et al. |
| 2011/0300843 | A1 | 12/2011 | Miller et al. |
| 2012/0092129 | A1 | 4/2012 | Lickfelt |
| 2012/0190380 | A1 | 7/2012 | Dupray et al. |
| 2012/0280836 | A1 | 11/2012 | Roesner |
| 2013/0084847 | A1 | 4/2013 | Tibbitts et al. |
| 2013/0332060 | A1 | 12/2013 | Chowdhary |
| 2014/0062724 | A1 | 3/2014 | Varoglu et al. |
| 2014/0074667 | A1 | 3/2014 | Smith |
| 2014/0213176 | A1 | 7/2014 | Mendelson |
| 2014/0309815 | A1 | 10/2014 | Ricci et al. |
| 2015/0002271 | A1 | 1/2015 | Lee et al. |
| 2015/0018011 | A1 | 1/2015 | Mendelson |
| 2015/0124096 | A1 | 5/2015 | Koravadi |
| 2015/0154554 | A1 | 6/2015 | Skaaksrud |
| 2015/0156747 | A1 | 6/2015 | Skaaksrud et al. |
| 2015/0186694 | A1 | 7/2015 | Fessler et al. |
| 2015/0309156 | A1 | 10/2015 | Chua et al. |
| 2015/0356498 | A1 | 12/2015 | Casanova et al. |
| 2016/0133125 | A1 | 5/2016 | Sandbrook |
| 2017/0243485 | A1 | 8/2017 | Rubin et al. |
| 2017/0318149 | A1 | 11/2017 | Daoud |
| 2017/0347238 | A1 | 11/2017 | Menouar |
| 2018/0128638 | A1 | 5/2018 | Lei et al. |
| 2018/0151009 | A1 | 5/2018 | Kim et al. |
| 2018/0299540 | A1 | 10/2018 | Cardno et al. |
| 2018/0374365 | A1 | 12/2018 | Rivera et al. |

FOREIGN PATENT DOCUMENTS

| | | |
|---|---|---|
| WO | 2007084673 A1 | 7/2007 |
| WO | 2019005839 A1 | 1/2019 |

OTHER PUBLICATIONS

U.S. Appl. No. 16/018,881, Non-Final Office Action, dated Nov. 29, 2018, 21 pages.
U.S. Appl. No. 16/018,881, Notice of Allowance, dated Oct. 9, 2019, 17 pages.
U.S. Appl. No. 16/749,613, Notice of Allowance, dated Apr. 1, 2020, 11 pages.
PCT/US2018/039564, International Search Report and Written Opinion, dated Oct. 26, 2018 13 pages.
18823878.6, Extended European Search Report, dated Feb. 12, 2021, 13 pages.

* cited by examiner

VEHICLE LOCATION TRACKING SYSTEMS AND METHODS

CROSS-REFERENCE TO RELATED APPLICATIONS

This application is a continuation of U.S. application Ser. No. 16/749,613, filed Jan. 22, 2020, now U.S. Pat. No. 10,720,061 issued Jul. 21, 2020, which is a continuation of U.S. application Ser. No. 16/018,881, filed Jun. 26, 2018, now U.S. Pat. No. 10,559,210 issued Feb. 11, 2020, which claims the benefit under 35 U.S.C. § 119(e) of U.S. Provisional Application No. 62/525,449, filed Jun. 27, 2017, each of which is hereby incorporated by reference herein in its entirety.

TECHNICAL FIELD

The present disclosure relates to tracking a vehicle location. Specifically, the present disclosure relates to vehicle location tracking.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

DETAILED DESCRIPTION

Figure 1:
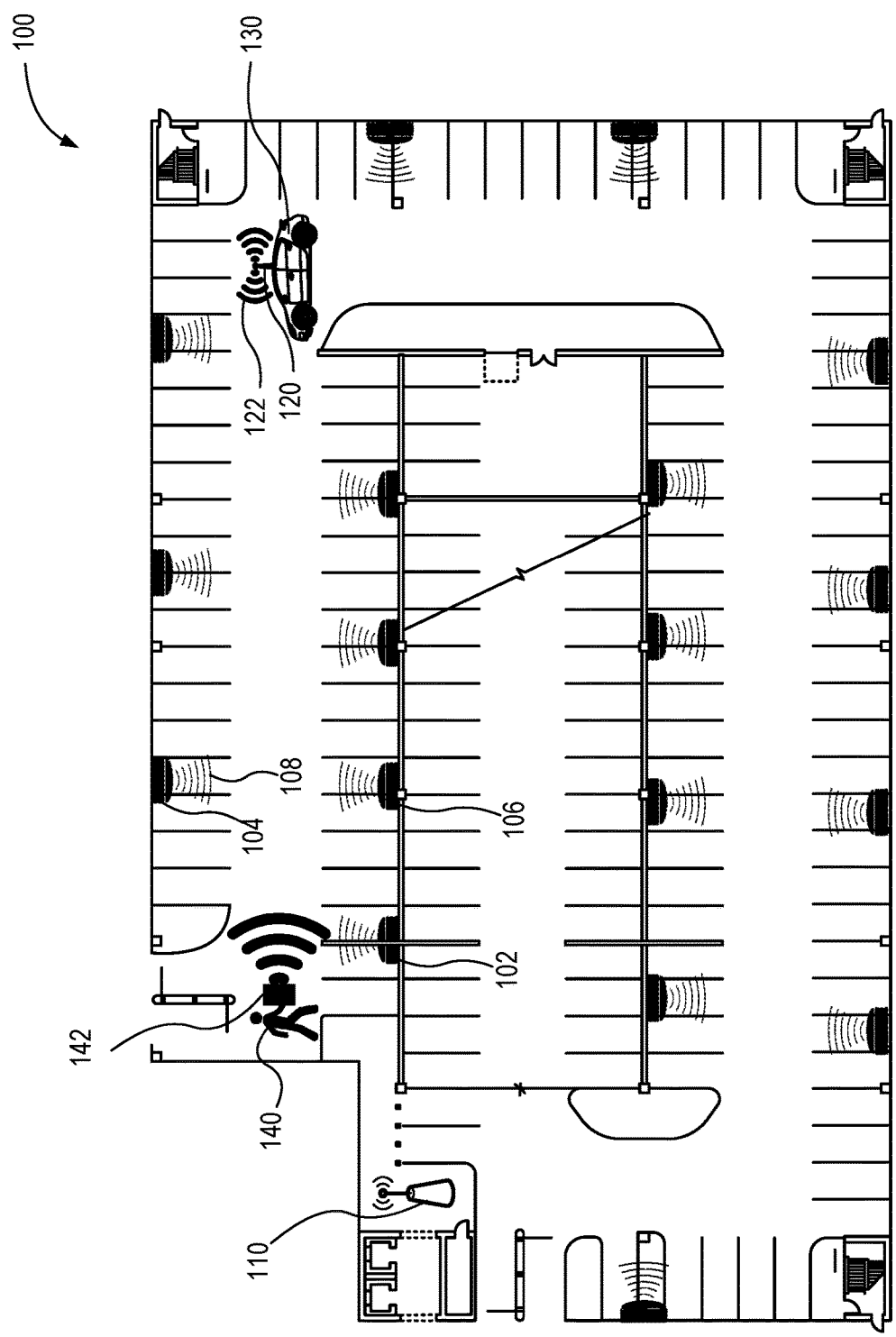
FIG. 1 illustrates a parking structure with a vehicle tracking system installed, according to one embodiment.

This disclosure describes systems and methods for tracking a location of a vehicle. Some example embodiments herein describe a tracking system used inside a parking structure. However, the tracking systems and methods described herein may be implemented on an outdoor lot, within a structure, or in a facility that combines indoor and outdoor parking. A vehicle location tracking system may comprise a plurality of transceivers, a coordinator, and a plurality of identification tags. The plurality of identification tags are coupled to a fleet of vehicles to be tracked. The transceivers are positioned within the parking structure and/or parking lot and measure the strength of a signal emitted by an identification tag coupled to a vehicle. The transceivers communicate the measured signal strength to the coordinator (e.g., a central node), and the coordinator estimates the location of the vehicle based on the measured signal strength.

Managing a fleet of vehicles includes tracking the location of each vehicle. For example, in a rental fleet the parking location of returned vehicles is recorded to assist a renter in locating the correct vehicle. Recording the location of each vehicle may be done manually. For example, when a renter returns a car, an employee may write the parking space in which the vehicle is parked on a return slip. However, as the number of cars in the fleet increases, this manual process can become more laborious. Also, when a renter returns a vehicle after hours, an employee may not be available to record the parking space to which the vehicle was returned.

To automate the vehicle location, a global positioning system (GPS) may be used. The GPS may report the location of each vehicle, making manual recording unnecessary. However, a GPS may fail to provide precise location information (e.g., parking stall number) and fail to track vehicles within parking garages. With a large inventory of vehicles, imprecise location may make it difficult to find a specific vehicle. Further, a parking garage may shield a vehicle from GPS signals, thereby limiting the effectiveness of a GPS vehicle location system indoors.

A vehicle location tracking system as disclosed herein may provide precise location information even when a vehicle is within a parking structure. In some embodiments, the vehicle location tracking system utilizes a network of radio frequency (RF) devices to locate a vehicle. For instance, a set of RF transceivers may determine signal strength from an RFID tag attached to a vehicle. Based on the signal strength at a plurality of RF transceivers, the vehicle location tracking system determines a location of the vehicle.

The vehicle location tracking system communicates vehicle location information with a device to assist in locating a specific vehicle. For example, in some embodiments, the vehicle location tracking system sends vehicle location information to a personal electronic device (PED), such as a smart phone or tablet, of a renter. The vehicle location tracking system may include an application on the PED that displays vehicle information including a map depicting a location of the vehicle.

As used herein, the phrase "coupled to" is broad enough to refer to any suitable coupling or other form of interaction between two or more components, including electrical and mechanical interaction. Two components may be coupled to each other even though there may be intermediary devices between the two components.

Some of the infrastructure that can be used with embodiments disclosed herein is already available, such as: general-purpose computers, computer programming tools and techniques, digital storage media, and communications networks. A computer may include a processor, such as a microprocessor, microcontroller, logic circuitry, or the like. The processor may include a special-purpose processing device, such as an ASIC, PAL, PLA, PLD, FPGA, or other customized or programmable device. The computer may also include a computer-readable storage device, such as non-volatile memory, static RAM, dynamic RAM, ROM, CD-ROM, disk, tape, magnetic memory, optical memory, flash memory, or another computer-readable storage medium.

Suitable networks for configuration and/or use, as described herein, include any of a wide variety of network infrastructures. Specifically, a network may incorporate landlines, wireless communication, optical connections, various modulators, demodulators, small form-factor pluggable (SFP) transceivers, routers, hubs, switches, and/or other networking equipment. The network may include communications or networking software, such as software available from Novell, Microsoft, Artisoft, and other vendors, and may operate using UDP, TCP/IP, SPX, IPX, SONET, and other protocols over twisted pair, coaxial, or optical fiber cables; telephone lines; satellites; microwave relays; modulated AC power lines; physical media transfer; wireless radio links; and/or other data transmission "wires." The network may encompass smaller networks and/or be connectable to other networks through a gateway or similar mechanism.

Aspects of certain embodiments of a tracking system may be implemented as software modules or components. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., which perform one or more tasks or implement particular abstract data types. A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media.

Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network. According to one embodiment, a database management system (DBMS) allows users to interact with one or more databases and provides access to the data contained in the databases.

In the following description, various aspects of the illustrative implementations will be described using terms commonly employed by those skilled in the art to convey the substance of their work to others skilled in the art. However, it will be apparent to those skilled in the art that the disclosure may be practiced with only some of the described aspects. For purposes of explanation, specific configurations are set forth in order to provide a thorough understanding of the illustrative implementations. However, it will be apparent to one skilled in the art that the disclosure may be practiced without the specific details. In other instances, well-known features are omitted or simplified in order not to obscure the illustrative implementations.

Various operations will be described as multiple discrete operations, in turn, in a manner that is most helpful in understanding the disclosure; however, the order of description should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 illustrates a parking structure with a vehicle tracking system 100 installed, according to one embodiment. The vehicle tracking system 100 may comprise a plurality of transceivers (e.g., transceivers 102, 104, and 106), a coordinator 110, and a plurality of identification tags (e.g., identification tag 120). The identification tags are coupled to fleet vehicles to be tracked (e.g., vehicle 130).

The identification tag 120 couples to the vehicle 130 and emits an identification signal 122 associated with the vehicle 130. In some embodiments, the identification tag 120 is an RFID or other RF transmitter. The RFID may be passive or active. If the RFID is active, the vehicle 130 may provide the energy necessary to operate the RFID. For example, in some embodiments, the vehicle 130 directly powers the RFID, while in other embodiments, the vehicle 130 maintains a charge on a battery powering the RFID. The power may come from the vehicle's battery or an electrical outlet in the vehicle 130.

The identification signal 122 may be used to identify vehicle information. In one embodiment, each car may be registered with the vehicle tracking system 100. The registration may capture the vehicle's make, model, year, license plate number, and other identifying information. Additionally, an identification tag 120 is associated with the vehicle 130 during registration. The identification signal 122 transmits a unique key that the vehicle tracking system 100 may store with the vehicle's information. The vehicle tracking system 100 may look up the vehicle's information based on the unique key transmitted via the identification signal 122.

The transceivers 102, 104, and 106 are placed within a parking structure and receive the identification signal 122. The transceivers 102, 104, and 106 may be configured to transmit and receive signals using one or more technologies including RF, Wi-Fi, Bluetooth, Zigbee, and Z-wave. In one embodiment, the transceivers 102, 104, and 106 are evenly spaced, and transceivers on opposing walls are offset.

The location of each transceiver 102, 104, and 106 may be manually recorded into the vehicle tracking system 100 or automatically determined by the vehicle tracking system 100. For example, in some embodiments, the distance between transceivers 102, 104, and 106 is calculated based on the strength of a signal transmitted from one transceiver to another. The location of each sensor may be mapped based on the relative distance between transceivers 102, 104, and 106.

The transceivers 102, 104, and 106 may receive the identification signal 122 and determine the strength of the identification signal 122 from the identification tag 120. The transceivers 102, 104, and 106 transmit a marker signal 108 comprising the identification signal 122, the signal strength, and a transceiver identifier or location to the coordinator 110 or central node. The coordinator 110 approximates the location of the vehicle 130 based on the signal strength of the identification signal 122 at one or more of the transceivers 102, 104, and 106. The coordinator 110 may communicate the vehicle location to external devices over a network connection (e.g., Wi-Fi, LTE, and 3G). For example, in one embodiment, the coordinator 110 provides the vehicle location to a PED 142 of a driver 140.

In some embodiments, the location of parking stalls may be determined. For example, the parking structure may be virtually mapped, and the location of each parking stall may be identified. The location of each of the transceivers 102, 104, and 106 relative to the parking stalls may be recorded. In some embodiments, a transceiver is placed in every parking stall. In some embodiments, the parking stalls may have a stall identification tag (e.g., RFID tag) positioned within the stall or on an adjacent wall of the parking structure. The vehicle tracking system 100 may compare the signal strength from the stall identification tag at the transceivers 102, 104, and 106 to determine the location of a parking stall. In some embodiments, the location of the parking stalls is compared to the location of the vehicle 130 to determine a specific parking stall that the vehicle 130 is parked in. In some embodiments, the signal strength from the stall identification tag may be compared to the strength of the identification signal 122 from the identification tag 120 to determine which parking stall the vehicle 130 is in.

In some embodiments, the transceivers may be located on one or more vehicles (e.g., vehicle 130). The transceivers on the vehicles may identify the location of the vehicles relative to each other (relative location). Further, in some embodiments, the one or more vehicles may have GPS tracking units. The vehicle tracking system 100 may identify one or more of the GPS tracking units with a signal strength above a target threshold and identify the transceiver(s) associated with the same vehicle(s). The identified transceiver(s) may be used to tie the relative location of the one or more vehicles to GPS coordinates. The vehicle tracking system 100 may identify GPS coordinates for vehicles with GPS tracking units with a signal strength below the target threshold by using the location of those vehicles relative to the vehicles with GPS tracking units with a signal strength above the target threshold. In some embodiments, the GPS tracking unit with the highest signal strength is used to determine a first vehicle location and the relative location from the transceivers is used to identify a location for other vehicles in the parking facility.

In some embodiments, the transceivers 102, 104, and 106 may also communicate with a driver identification tag. The driver identification tag may be the PED 142 or an RFID on a set of keys. The driver identification tag may transmit a signal to the transceivers 102, 104, and 106 that identifies the driver identification tag. For example, an application on the PED 142 may cause a Wi-Fi or Bluetooth transmitter associated with the PED 142 to transmit the signal.

The driver identification tag may allow the transceivers 102, 104, and 106 and coordinator 110 to determine a current location of the driver 140. In some embodiments, the current driver location is determined based on the signal strength from the driver identification tag at one or more of the transceivers 102, 104, and 106. In some embodiments, the transceiver with the greatest signal strength may communicate a location associated with the transceiver to the PED 142 to approximate the driver's location (e.g., within the parking structure).

The vehicle tracking system 100 may use the current location of the driver 140 and prepare and send directions from the current location of the driver 140 to the location of the vehicle 130. For example, the vehicle tracking system 100 may determine a location of the driver identification tag and a location of the identification tag 120 on the vehicle 130 and provide a map with navigation markers directing the driver 140 to the vehicle 130.

In some embodiments, the transceivers 102, 104, and 106 may communicate using various protocols. In some embodiments, the communication between transceivers 102, 104, and 106, the identification tag 120, the driver identification tag, and the coordinator 110 may be different. For example, the transceivers 102, 104, and 106 may locate a vehicle 130 using RF, track a driver 140 using Bluetooth, and communicate with the coordinator 110 using Wi-Fi. In some embodiments, the transceivers 102, 104, and 106 use RF only.

Figure 2:
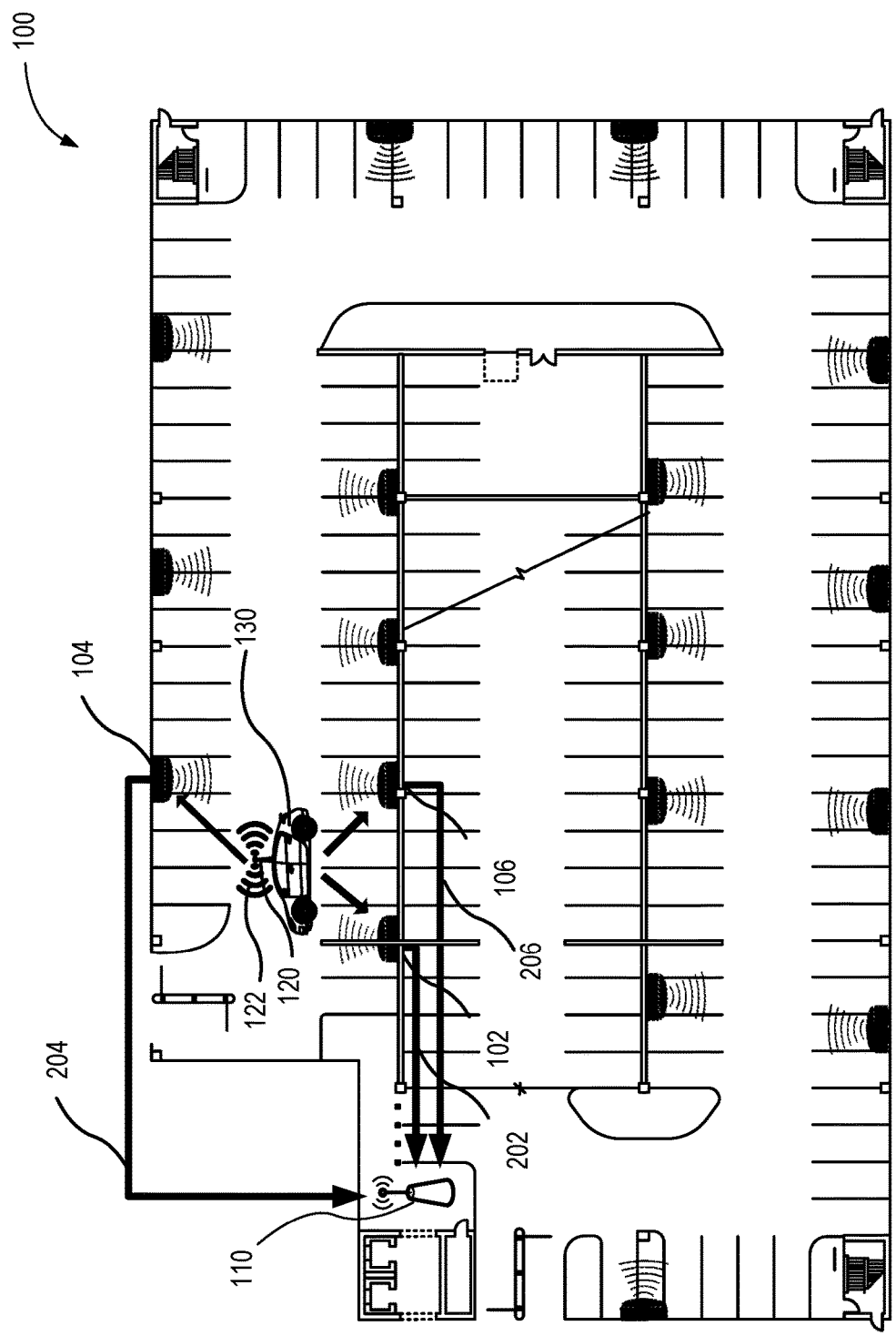
FIG. 2 illustrates a vehicle tracking system approximating a vehicle's location, according to one embodiment.

FIG. 2 illustrates a vehicle tracking system 100 approximating a vehicle's location, according to one embodiment. The transceivers 102, 104, and 106 may be positioned throughout an area where GPS typically fails. As the vehicle 130 with the identification tag 120 travels within range of a transceiver (e.g., 102, 104, or 106), the transceiver 102, 104, or 106 determines the signal strength of the signal emitted by the identification tag 120. In some embodiments, the signal emitted by the identification tag 120 and received by the transceivers 102, 104, 106 is an RF signal.

The transceivers 102, 104, 106 send the recorded signal strength to the coordinator 110 through the communication channels 202, 204, 206 of a communication network. The communication network may operate using one or more technologies including RF, Wi-Fi, Bluetooth, Zigbee, and Z-wave. In some embodiments, when a transceiver 102, 104, or 106 is not in range of the coordinator 110, the transceivers 102, 104, and 106 operate as a mesh network to route the message back to the coordinator 110.

The coordinator 110 may relay information to a backend service for processing. In some embodiments, the coordinator 110 comprises the backend service. In other embodiments, the backend service is remote from the coordinator 110. To communicate with a remote backend service, the coordinator 110 may use a variety of networks including a cellular network, a Wi-Fi network, or the Internet. The backend service may be a remote server. For example, the backend service may comprise a web server that a user may access through an Internet connection.

The backend service uses the signal strength information from the transceivers 102, 104, and 106 to approximate the location of vehicles in the area. For example, the backend service may triangulate the location of the vehicle 130 using the signal strength information and a location of each of the transceivers 102, 104, and 106. In some embodiments, the backend service estimates the vehicle's location based on signal strength from a subset of transceivers. For instance, the subset of transceivers may include the three transceivers with the greatest recorded signal strength.

The backend service also determines the vehicle information (make, model, license plate number, VIN, color, etc.) using the signal emitted by the identification tag 120. For example, the backend service may decode the signal from the identification tag 120 to determine a vehicle identifier. The backend service may use the vehicle identifier to lookup the vehicle information in a vehicle information database.

The backend service sends the vehicle information and location information to a user (e.g., rental car personnel or driver) to assist in locating the vehicle 130. The backend service may send the vehicle information and location information to the user via an application on a PED, a web interface, or outer suitable means. In some embodiments, a map of the parking structure may be displayed on a PED, and the location information may be used to position a marker on the map indicating the location of the vehicle 130.

Figure 3:
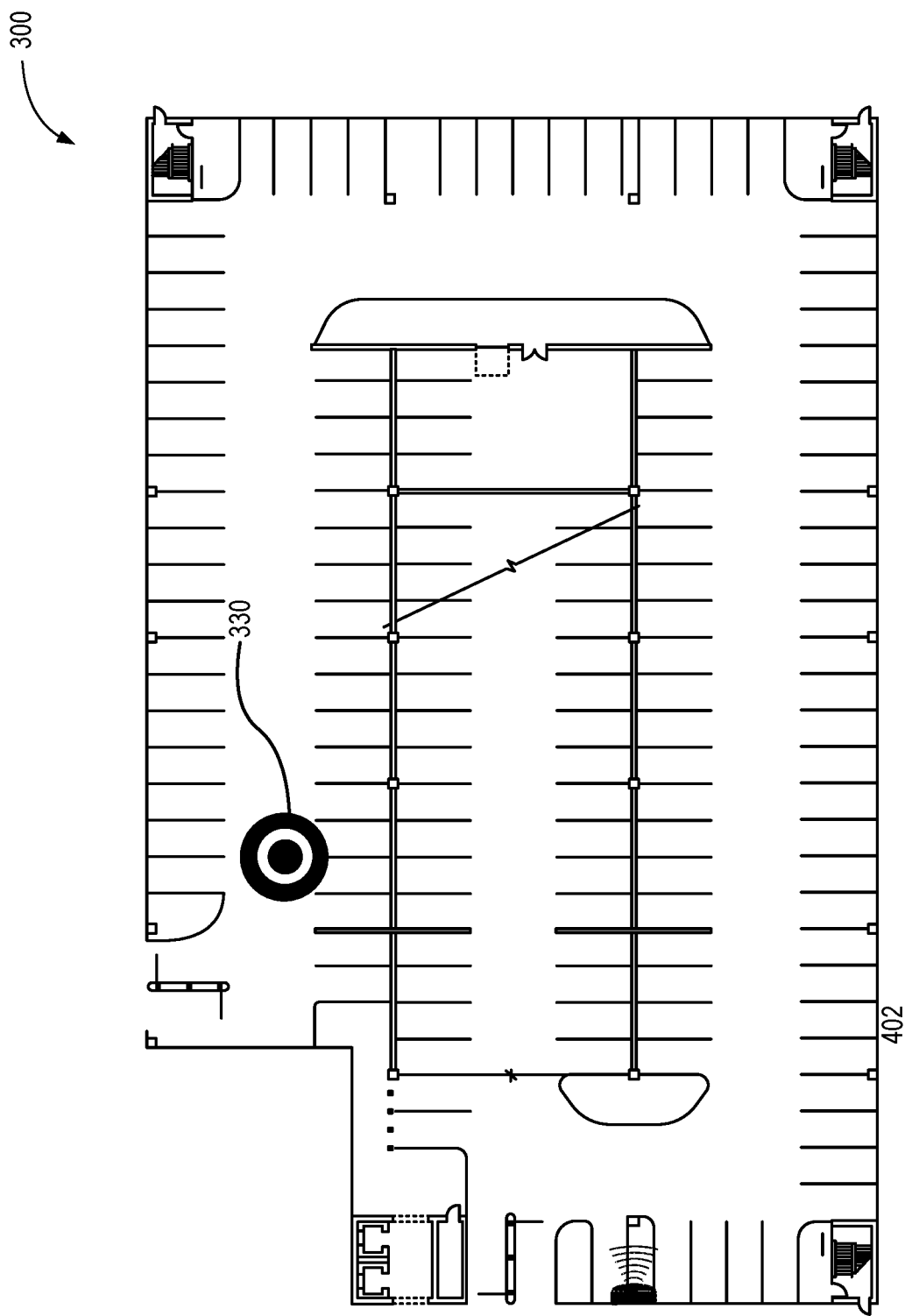
FIG. 3 is a map generated by a vehicle tracking system depicting a vehicle's location, according to one embodiment.

FIG. 3 is a map 300 generated by a vehicle tracking system depicting a vehicle's location, according to one embodiment. The vehicle tracking system overlays a marker indicating the vehicle's location 330 on an image or drawing of the parking structure. The map 300 may be sent directly to a driver, a fleet manager, or another user. The vehicle's location 330 may automatically update when the vehicle is moved.

Figure 4:
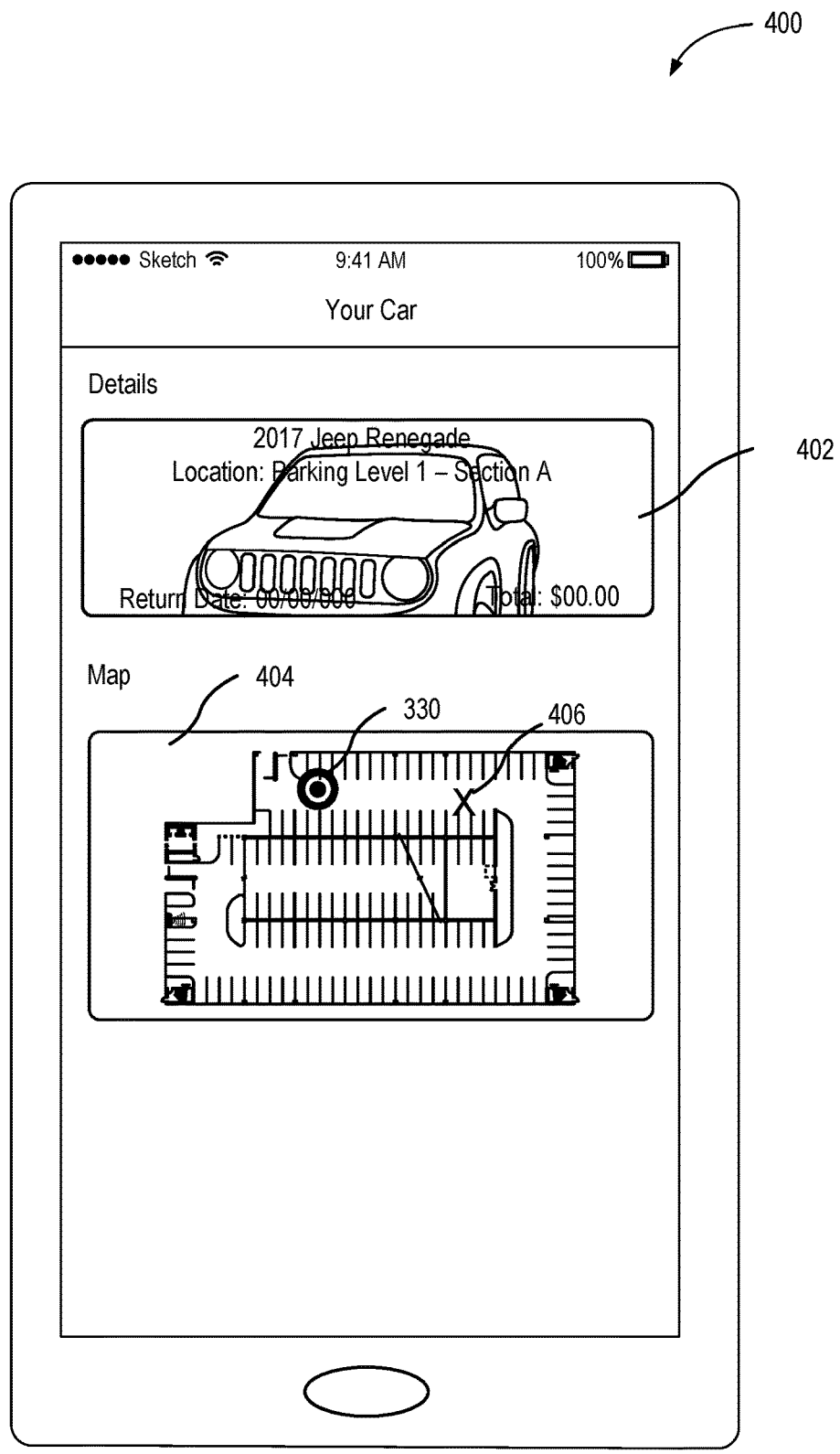
FIG. 4 illustrates a user interface to provide vehicle information accrued by a vehicle tracking system, according to one embodiment.

FIG. 4 illustrates a user interface 400 to provide vehicle information accrued by a vehicle tracking system, according to one embodiment. To assist a driver in finding a vehicle, the user interface 400 may include a location of the vehicle and a description of the vehicle.

In this example, the user interface 400 includes a vehicle information region 402 and a map region 404. The vehicle information region 402 displays identifying information related to the vehicle. For example, as shown, identifying information includes year, make, model, parking level and section, return date, and rental price. The map region 404 displays the vehicle's location 330. In some embodiments, as shown, the map region 404 also displays the driver's current location 406. Detailed directions to the vehicle's location 330 may be given to the driver audibly, in text, or via indicators on the map.

In some embodiments, the vehicle's location 330 may be determined based on proximity to transceivers, and the driver's current location 407 may be is based on a global positioning system signal received by a personal electronic device associated with the driver. Thus two location systems may be used and displayed on the same map.

Figure 5:
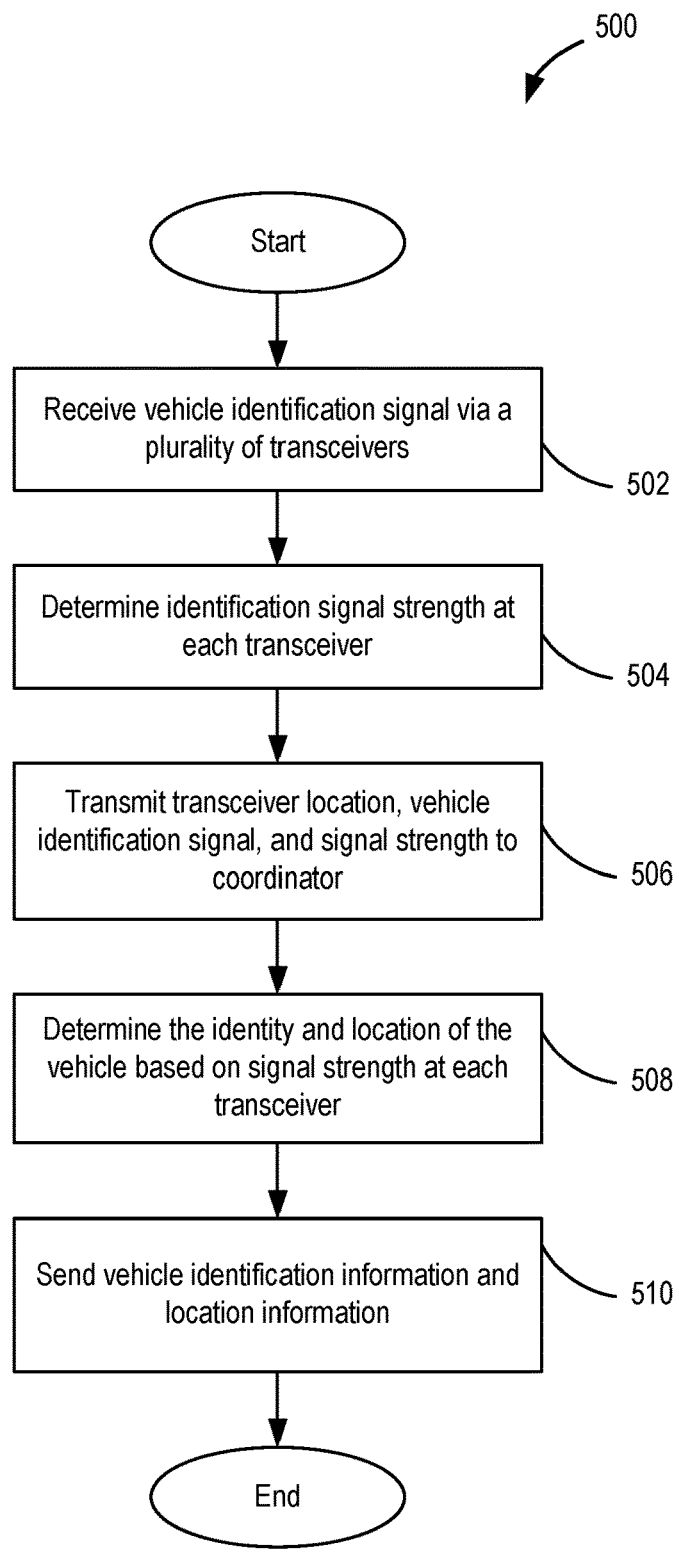
FIG. 5 is a flow diagram of a method for tracking a location of a vehicle, according to one embodiment.

FIG. 5 is a flow diagram of a method 500 for tracking a location of a vehicle, according to one embodiment. The method 500 may work inside a structure where GPS has poor signal strength. As shown, a system using this method 500 receives 502 a vehicle identification signal via a plurality of transceivers. The method 500 further determines 504 identification signal strength at each transceiver. In some embodiments, the signal strength of a subset of transceivers is determined. Each transceiver transmits 506 the transceiver location, a vehicle identifier from the vehicle identification signal, and the signal strength to a coordinator. The coordinator determines 508 the identity of the vehicle by processing the vehicle identifier, and identifies the location of the vehicle based on signal strength at each transceiver. The coordinator sends 510 vehicle identification information and location information. This information may be sent to a fleet manager or a driver. The location information may include a parking stall, a map, and directions.

Figure 6:
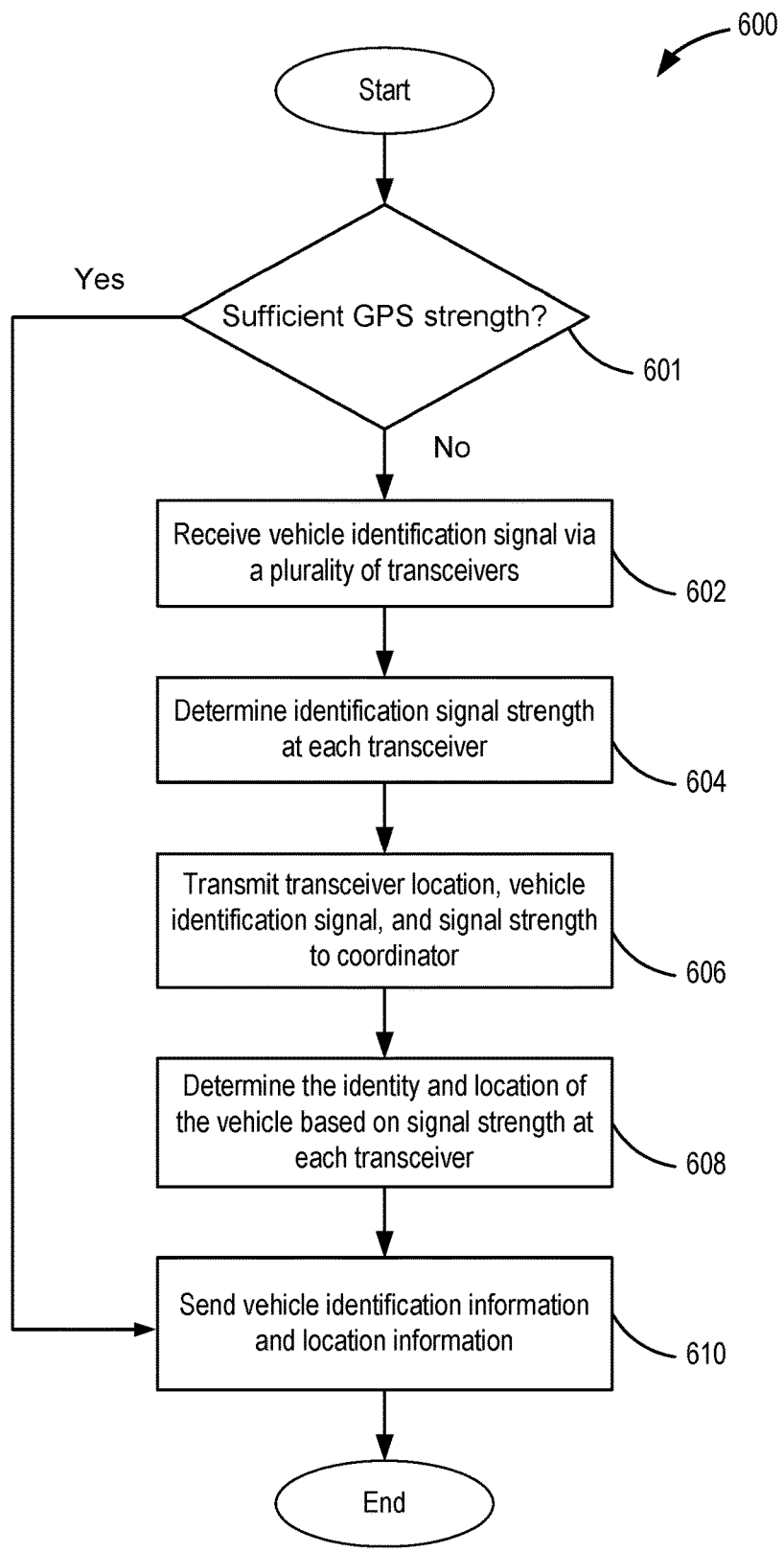
FIG. 6 is a flow diagram of a method for tracking a location of a vehicle using multiple location systems (e.g., GPS and RF-based), according to one embodiment.

FIG. 6 is a flow diagram of a method 600 for tracking a location of a vehicle using multiple location systems (e.g., GPS and RF-based), according to one embodiment. In some cases, a fleet of vehicles may be stored partially inside and outside a structure. In these cases an RF-based interior tracking system may be paired with a GPS system. In the illustrated embodiment, the method 600 first checks 601 if there is sufficient GPS strength (e.g., signal-to-noise ratio above a target threshold) from a GPS tracking unit associated with a vehicle to obtain location information for a vehicle using GPS. If there is, the system locates the vehicle using GPS and sends 610 vehicle identification information and location information using the GPS data.

When there is not sufficient GPS strength to use GPS data, the system using this method 600 receives 602 a vehicle identification signal via a plurality of transceivers. The method 600 further determines 604 identification signal strength at each transceiver. Each transceiver transmits 606 the transceiver location, the vehicle identification signal, and the signal strength to a coordinator. The coordinator determines 608 the identity of the vehicle by processing the vehicle identification signal, and identifies the location of the vehicle based on signal strength at each transceiver. The coordinator sends 610 vehicle identification information and location information. This information may be sent to a fleet manager or a driver. The location information may include a parking stall, a map, and directions.

In some embodiments, the GPS data and the data from the transceiver may be used to validate each other. For example, if a GPS location is not near the location as determined by the transceivers, the system may determine that the GPS location has an error and use the location as determined by the transceivers. If errors between the two location systems continue, an alert may be sent to a system manager to notify the system manager of a potential problem with the GPS system or the transceivers.

Embodiments may be provided as a computer program product including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable media suitable for storing electronic and/or processor executable instructions.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims are hereby expressly incorporated into this Detailed Description, with each claim standing on its own as a separate embodiment. This disclosure includes all permutations of the independent claims with their dependent claims.

It will be understood by those having skill in the art that many changes may be made to the details of the above-described embodiments without departing from the underlying principles of the invention. The scope of the present invention should, therefore, be determined only by the following claims.

The invention claimed is:

1. A vehicle location system, comprising:
a plurality of vehicle identification tags respectively coupled to a plurality of vehicles, each vehicle identification tag configured to emit an identification signal associated with one of the plurality of vehicles;
a plurality of stall identification tags, each stall identification tag being configured to emit a stall identification signal relative to one or more corresponding parking stalls of a plurality of parking stalls;
a plurality of transceivers to:

receive the identification signals from the plurality of vehicle identification tags and the stall identification signals from the plurality of stall identification tags;

determine a signal strength associated with each of the received identification signals and the received stall identification signals; and transmit a marker signal comprising a transceiver identification, a vehicle identifier, and the signal strengths; and a coordinator to receive the marker signal from the plurality of transceivers, determine a location of one or more of the plurality of vehicles based on a comparison of the signal strengths associated with the received identification signals and the received stall identification signals, and send an indication of the location of at least one of the one or more vehicles to one or more of a plurality of users, the indication of the location of the at least one of the one or more vehicles comprising identification of a particular parking stall of the plurality of parking stalls.

2. The vehicle location system of claim 1, wherein the location of one or more of the plurality of vehicles is further based on a comparison of the signal strengths at each of the plurality of transceivers.

3. The vehicle location system of claim 1, wherein the location of one or more of the plurality of vehicles is further based on a comparison of the signal strengths at a subset of the plurality of transceivers.

4. The vehicle location system of claim 1, wherein the coordinator is further configured to transmit the indication of the location of the at least one of the one or more vehicles to a personal electronic device.

5. The vehicle location system of claim 1, wherein the plurality of transceivers are further configured to send an estimated current location of at least one of the plurality of users to a personal electronic device of the at least one user.

6. The vehicle location system of claim 5, wherein the estimated current location of the at least one user is based at least partially on a global positioning system signal received by the personal electronic device, wherein the estimated current location of the at least one user and the determined location of one or more of the plurality of vehicles are to be displayed on a map of the personal electronic device.

7. The vehicle location system of claim 1, further comprising a plurality of driver identification tags, each driver identification tag configured to emit a driver identification signal associated with a current location of a driver, each driver identification tag being coupled to a key usable to operate one of the plurality of vehicles.

8. A method to track a vehicle location, the method comprising:

receiving, at one or more of a plurality of transceivers, an identification signal from one or more of a plurality of identification tags that are each coupled to a particular corresponding vehicle, each identification signal being associated with the particular corresponding vehicle;

receiving, at the one or more of the plurality of transceivers, a stall identification signal from one or more of a plurality of stall identification tags, each stall identification signal being relative to one or more corresponding parking stalls of a plurality of parking stalls;

monitoring, at the one or more of the plurality of transceivers, a signal strength of the received identification signal and the stall identification signal;

determining a location of at least one particular corresponding vehicle based on a comparison of the signal strength of the received identification signal against the received stall identification signal at each of the plurality of transceivers, the location comprising identification of the particular corresponding vehicle at a particular parking stall of the plurality of parking stalls; and sending an indication of the location to a user.

9. The method of claim 8, wherein the location of the at least one corresponding vehicle is further based on a comparison of the signal strengths at each of the plurality of transceivers.

10. The method of claim 8, wherein the location of the at least one corresponding vehicle is further based on a comparison of the signal strengths at a subset of the plurality of transceivers.

11. The method of claim 8, further comprising transmitting the location of the at least one corresponding vehicle location to a personal electronic device.

12. The method of claim 8, further comprising sending an estimated current location of the user to a personal electronic device of the user.

13. The method of claim 12, wherein the estimated current location of the user is based at least partially on a global positioning system signal received by the personal electronic device, wherein the estimated current location of the user and the location of one or more of the plurality of vehicles are to be displayed on a map of the personal electronic device.

14. The method of claim 8, wherein a plurality of driver identification tags are each configured to emit a driver identification signal associated with a current location of a driver, each driver identification tag being coupled to a key usable to operate one of the plurality of vehicles.

15. A vehicle location system comprising:

an identification tag coupled to a particular vehicle, the identification tag configured to emit an identification signal associated with the particular vehicle;

a plurality of stall identification tags, each stall identification tag being configured to emit a stall identification signal relative to one or more corresponding parking stalls of a plurality of parking stalls;

a plurality of transceivers to receive signals from the identification tag and the plurality of stall identification tags;

a processor; and a non-transitory computer-readable medium with instructions stored thereon that, when executed by the processor, cause the processor to perform operations to:

monitor a signal strength of the received identification signal and at least one of the received stall identification signals at one or more of the plurality of transceivers;

determine a location of the particular vehicle based on a comparison of the signal strength of the received identification signal against the at least one of the received stall identification signals at each of the plurality of transceivers, the location comprising identification of the particular vehicle at a particular parking stall of the plurality of parking stalls; and send an indication of the location to a user.

16. The vehicle location system of claim 15, wherein the plurality of transceivers are further configured to send an estimated current location of the user to a personal electronic device of the user.

17. The vehicle location system of claim 16, wherein the estimated current location of the user is relative to the plurality of parking stalls and the personal electronic device comprises a smart phone of the user.

18. The vehicle location system of claim 16, wherein the estimated current location of the user is based at least partially on a global positioning system signal received by the personal electronic device, wherein the estimated current location of the user and the location of one or more of the plurality of vehicles are to be displayed on a map of the personal electronic device.

19. The vehicle location system of claim 15, wherein the location comprises a data corresponding to a map of a parking facility and a stall number within the parking facility.

20. The vehicle location system of claim 19, wherein the instructions further cause the processor to identify the particular vehicle based on the signal from the identification tag, and send, via one of the plurality of transceivers, vehicle identification information and location information.

\* \* \* \* \*